United States Patent [19]
Girguis

[11] 3,789,626
[45] Feb. 5, 1974

[54] CONSTANT VELOCITY UNIVERSAL JOINT
[75] Inventor: Sobhy Labib Girguis, Troisdorf, Germany
[73] Assignee: Uni-Cardan AG, Lohmar/Reinl, Germany
[22] Filed: Mar. 21, 1972
[21] Appl. No.: 236,602

[30] Foreign Application Priority Data
Mar. 25, 1971 Germany............................. 2114536
Dec. 24, 1971 Germany............................. 2164432
Dec. 24, 1971 Germany............................. 2164433
Dec. 24, 1971 Germany............................. 2164431

[52] U.S. Cl............................................ 64/21, 64/8
[51] Int. Cl................................................. F16d 3/30
[58] Field of Search................................ 64/21, 8 R

[56] References Cited
UNITED STATES PATENTS
2,432,216   12/1947   Suczek............................. 64/21
3,133,432   5/1964    Mazziotti......................... 64/21
3,204,429   9/1965    Kayser............................. 64/21
3,664,152   5/1972    Macielinski...................... 64/8
3,520,152   7/1970    Schmid............................ 64/21
3,522,714   8/1970    Wildhaber........................ 64/21
3,557,572   1/1971    Aucktor et al.................... 64/21

FOREIGN PATENTS OR APPLICATIONS
1,289,370   1/1967    Germany........................... 64/8

Primary Examiner—Benjamin W. Wyche
Assistant Examiner—Randall Heald
Attorney, Agent, or Firm—Edmund M. Jaskiewicz

[57] ABSTRACT

A constant velocity universal joint comprises an annular outer joint element having grooves on its inner surface parallel with the axis of the joint. An inner joint element is positioned within the outer joint element and is provided with grooves on its outer surface to form pairs of opposed grooves with the grooves on the outer joint element. A ball is positioned in every pair of opposed grooves and a cage disposed between the two joint elements retains the balls in a plane perpendicular to the axis of the cage. The cage is guided within the outer joint element by a spherical surface on the outer face of the cage and is guided with respect to the inner joint element by a spherical surface on the inner face of the cage. The centers of the inner and outer spherical surfaces of the cage are equidistant on opposite sides of the plane passing through the centers of the balls. A control device as a separate element or elements is mounted on the inner joint element and is provided with a spherical or cylindrical surface for coaction with the inner spherical surface of the cage.

46 Claims, 44 Drawing Figures

PATENTED FEB 5 1974 3,789,626
SHEET 05 OF 11

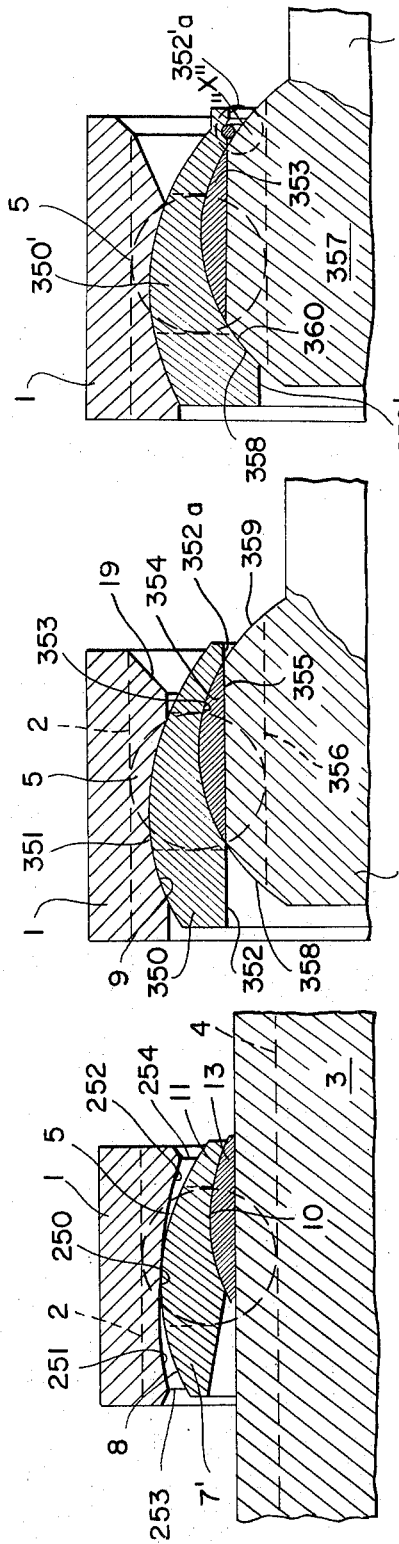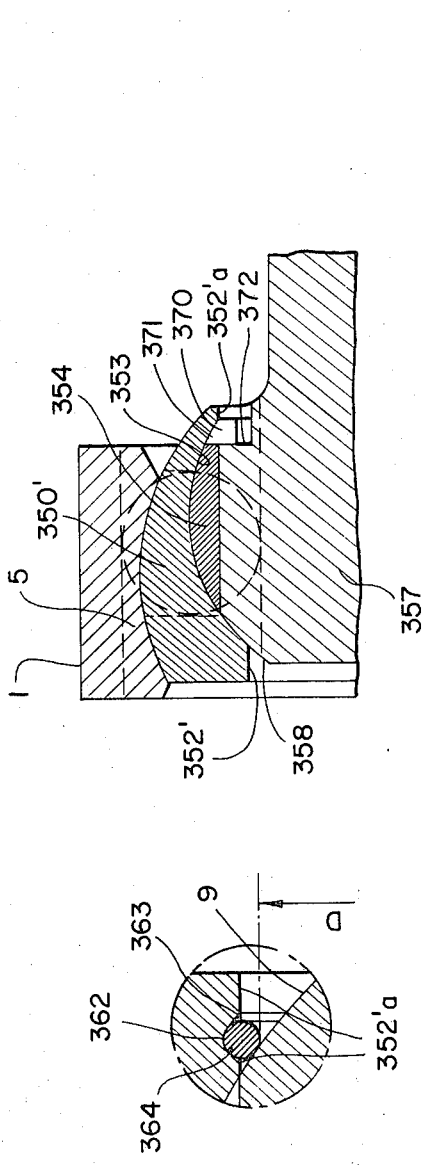

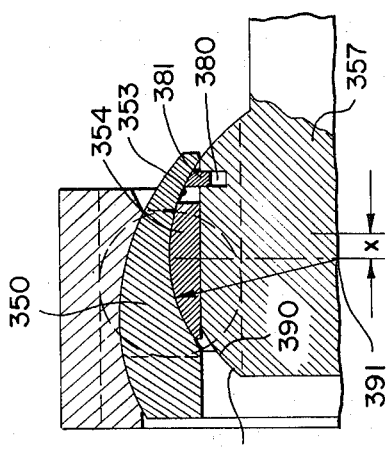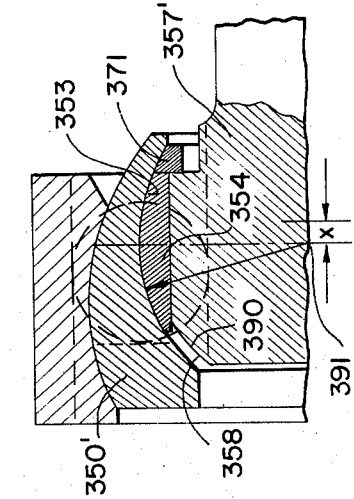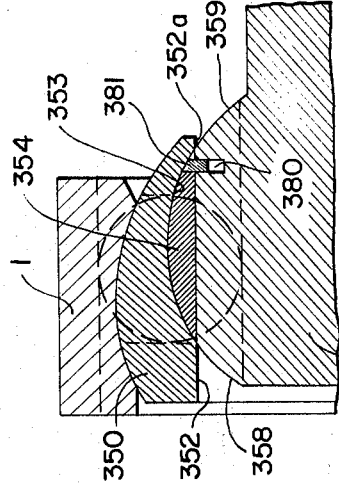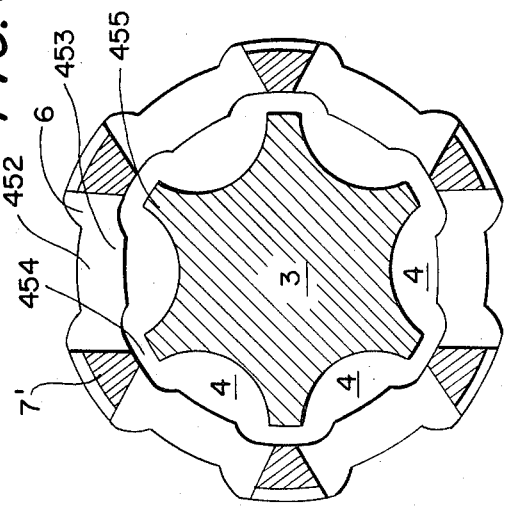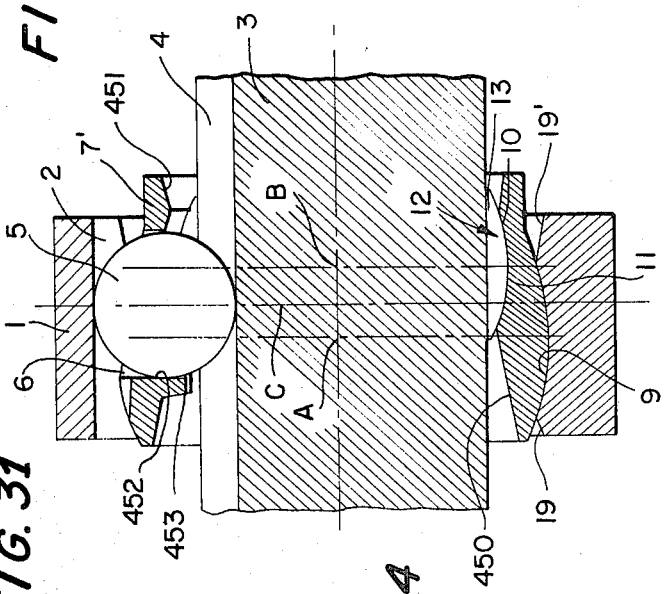

CONSTANT VELOCITY UNIVERSAL JOINT

The present invention relates to a constant velocity universal joint more particularly, to a control device mounted on the inner joint element and guiding the movement of the ball retainer cage.

A known form of constant velocity universal joint comprises an annular outer joint element having grooves on its inner surface parallel with the axis of the joint. An inner joint element is positioned within the outer joint element and is provided with grooves on its outer surface to form pairs of opposed grooves with the grooves on the outer joint element. A ball is positioned in every pair of opposed grooves and a cage disposed between the two joint elements retains the balls in a plane perpendicular to the axis of the cage. The cage is guided within the outer joint element by a spherical surface on the outer face of the cage and is guided with respect to the inner joint element by a spherical surface on the inner face of the cage. The centers of the inner and outer spherical surfaces of the cage are equidistant on opposite sides of the plane passing through the centers of the balls. A control device as a separate element or elements is mounted on the inner joint element and is provided with a spherical or cylindrical surface for coaction with the inner spherical surface of the cage.

In this type of universal joint the inner joint element is either provided with a spherical surface or comprises a spherical portion on which a coacting spherical surface of the ball retainer cage is guided. When the universal joint is to function as a fixed joint wherein the inner and outer joint elements move only angularly with respect to each other, then the outer joint element is provided on its inner surface with a spherical surface in which the outer spherical surface of the cage is guided. If it is desired to have the universal joint function as a sliding joint wherein the joint members can not only move angularly with respect to each other but can also be displaced in an axial direction, then the outer spherical surface of the cage is guided on a cylincrical surface formed on the inner face of the outer joint element.

In the assembly of a fixed universal joint of the type described above, the cage is built into the outer joint element and the inner joint element is built into the cage it is necessary to pivot the inner joint element about 90° with respect to the outer joint element when the balls are inserted. It is therefore always necessary to construct the inner joint element as a hollow member that is subsequently connected to a shaft by splines or the like. Since the splined shaft must transmit the entire torque and the inner joint element must possess a sufficient wall thickness to withstand this torque the size of the balls and, accordingly, the torque which can be transmitted from the inner joint element to the outer joint element is limited with respect to a predetermined size or volume of the joint.

In a sliding constant velocity universal joint as described above, the outer spherical surface of the cage is guided within the cylindrical bore of the outer joint element. A guiding member having a spherical surface is slidingly positioned on the shaft or inner joint element connected to the shaft in order to support and guide the cage. This construction has the disadvantage that as the bending angle between the inner and outer joint elements increases, the possible axial displacement between these two elements decreases since the increasing angular deflection causes the cage guided on the outer joint element and the shaft connected to the inner joint element to abut sooner against the outer joint element. In addition, this also occurs for the movement of the inner joint element with respect to the cage. Moreover, the displacement of the inner joint element with respect to the cage is limited structurally since the maximum displacement must be less than the offset distance of the center of the control cage with respect to the plane which passes through the centers of the balls retained by the cage. As a result, the complete structure of the universal joint is relatively large and occupies a considerable amount of space, even though the inner joint element and an intermediate shaft can be combined.

The constant velocity universal joint of the present invention can also be employed as a fixed joint wherein the joint operates permanently bent at a fixed angle. Such joints have a number of applications such as in the drive shaft of a rear drive motor vehicle. For this particular application the universal joint has a relatively simple structure the object of which is to maintain the control elements free of axial forces. However, the joint is constructed so as to be able to absorb axial forces at least in a main direction. In addition, this particular type of fixed joint can be used as a sliding joint having a relatively small path of axial displacement.

The inner joint element has spherical surfaces laterally disposed in an axial direction with respect to the plane passing through the centers of the balls and the diameter of the lateral spherical surfaces is equal to that of the control device. In the fixed joint the centers of the lateral spherical surfaces coincide with the center of the spherical surface of the control elements. In the sliding joint, a center of at least one lateral spherical surface is displaced axially on the axis of the inner joint element in the direction of the other lateral spherical surface.

The advantages of this universal joint construction is that the joint can function as either a fixed joint or a sliding joint for small displacement paths merely by the adaptation of existing structure and without substantial modifications in the structure. Further, there is the advantage that additional elements to secure the position of the control elements with respect to the inner joint part are not required and that the axial force is not transmitted through the control elements.

Another problem in connection with the constant velocity universal joint to which the present invention relates is that when the bending angle is increased, the larger bending angle will require a correspondingly large space for movement of the inner joint element with respect to the ball retainer cage. In the present universal joint, the cage moves about its center with respect to the inner joint element. Where the universal joint has a relatively large displacement of the centers of the inner and outer spherical surfaces of the cage with respect to the plane passing through the centers of the balls, the cage must then be provided with a relatively larger axial extension on one side. It is thus necessary that the inner openings through the cage must become wider as the distance from the center of the inner spherical surface of the cage increases.

Since the ball openings are located in this area of the cage, there is thus a reduction in the thickness of the cage and, accordingly, the height of these ball openings is also reduced. In addition, during bending of the joint, the contact surfaces of the balls on the cage opening surface is shifted radially. Also, the contact surface of the balls on the cage opening surfaces also changes during each revolution of the joint. Through one portion of a revolution the ball lies on the opening surface which is adjacent to the inner spherical surface of the cage and upon a further portion of the revolution on the window surface which is away from the inner spherical surface of the cage.

Basically, the reduction in the height of the ball opening affects the opening surface which is away from the inner spherical surface of the cage. A deviation to the extent of a small displacement of the centers of the inner and outer spherical surfaces of the cage on both sides of the plane passing through the ball centers would bring about a deterioration of the control of the joint because of the shortened lever arms. Further, a reduction in the cage opening surface can also lead to a situation where the inner edge of the opening surface which is away from the inner spherical surface of the cage is displsed above the center of the balls so that the balls become jammed and the joint is inoperative.

It is therefore the principal object of the present invention to provide a novel and improved constant velocity universal joint, both of the sliding and fixed types.

It is another object of the present invention to provide a constant velocity universal joint which can transmit substantially higher torques with the same structural volume of the joint.

It is a further object of the present invention to provide a constant velocity universal joint which has a greater maximum bending angle and at the same time permits unimpeded axial displacement of the joint elements with respect to each other.

It is an additional object of the present invention to provide a constant volocity universal joint which can be readily assembled with simplified manufacturing processes requiring less time and which processes are suitable for both the sliding and fixed type joints.

It is still another object of the present invention to provide a constant velocity universal joint by which it is possible to increase the bending angle while retaining a relatively large displacement of the centers of the inner and outer spherical surfaces of the cage on both sides of the plane passing through the centers of the ball without hindering in any way the guiding of the balls by the cage.

The present invention may be summarized as a constant velocity universal joint essentially comprising an outer joint element having an axial bore therethrough and a plurality of grooves in the surface of the bore. At least a portion of each of the grooves is parallel to the axis of the outer joint element. An inner joint element is disposed within the axial bore and similarly has a plurality of grooves on its outer surface opposite the outer joint element grooves so as to define pairs of opposed grooves. A ball is positioned in each pair of opposed grooves and a ball retainer cage is arranged between the joint elements to retain the balls in a plane perpendicular to the axis of the cage. The cage has a first spherical surface on its outer face and a second spherical surface on its inner face. Means are provided on the surface of the bore of the outer joint element coacting with the cage first spherical surface for guiding the cage with respect to the outer joint element. The guiding means may comprise a conforming spherical surface, a cylindrical surface, or a combination of the two surfaces. The centers of the first and second cage spherical surfaces are equidistant on opposite sides of the plane passing through the centers of the balls in the cage. The improvement of the present invention resides in providing control device means as a separate component on the outer face of the inner joint element with the control device means having a spherical or cylindrical surface coacting with the cage second spherical surface for guiding the cage with respect to the inner joint element.

According to one embodiment of the present invention the control device comprises a plurality of control elements each having an outer spherical surface with a radius of curvature corresponding to the inner spherical surface of the cage. The control elements are positioned on the ridges of the outer surface of the inner joint element formed between adjacent grooves and also between the balls in the grooves. This embodiment of the control device is particularly suitable for constant velocity universal joints wherein the grooves on the inner and outer joint elements are parallel with the axes of the joint elements.

The control elements may also have outer surfaces which are spherical and which conform so as to closely coact with the inner spherical surface of the cage. The results and advantages of the present invention will also be obtained if the separate control elements positioned between the balls have their outer surfaces each defining a portion of a cylindrical surface. With this structure only the edges of the cylindrical surfaces would actually perform the guiding function. However, since the control device is not subjected to any forces except the control forces the edges of the control elements are sufficient for guiding purposes, even if the edges become somewhat worn after a relatively short period of operation. However, this wear can be promoted by chamfering the edges of the cylindrical surfaces of the control elements.

The control elements may be formed into a single control device by providing an annular member interconnecting the individual control elements.

For the particular application where the universal joint is bent through only a small angle and it is desired that the plane passing through the retained balls bisects the angle between the axes of the two joint elements such as would ocurr in high speed drive shafts, the control device may comprise a ring having an inner cylindrical surface positioned on the inner joint element and an outer spherical surface coacting with a spherical surface on the inner face of the cage. In this modification, the cage may be constructed as a cylindrical sleeve having its inner spherical surface adjacent one end thereof and a ring being positioned on the outer surface of the cage adjacent the other end thereof. The second ring is provided with an outer spherical surface which coacts with a spherical surface on the bore of the outer joint element.

The control devices described above and the modifications may be used for both sliding and fixed constant velocity universal joints. Thus, the same manufacturing tools and processees may be used for both the fixed and sliding joints.

The present invention which provides for a control device mounted as a separate component on the outer surface of the inner joint element significantly improves the process for manufacturing such a universal joint since it permits a simple assembly of the components. After the cage has been initially inserted into the outer joint element the control device is assembled in position and the balls are introduced into the openings of the cage, the inner joint element may then be introduced axially into the joint to complete the assembly. This permits the inner joint element and the shaft connected thereto to comprise a single integral member. Accordingly the spline connection or a similar connection for transmitting the torque from the shaft to the inner joint element is eliminated. This permits the use of substantially larger balls for the transmission of the torque for the same size of the universal joint and this in turn enables the transmitted torque to be significantly increased as compared with previously known constant velocity universal joints of the type described above since the torque is a function of the square of the diameter of the balls employed for transmission of the torque.

In addition, the use of larger balls permits an increase in the bending angle of the universal joint of about 5°-8° as compared with known constant velocity universal joints.

When the present invention is incorporated in a constant velocity universal joint of the sliding type the control device is mounted as being axially displaceable on the inner joint element. This arrangement enables the inner joint element to move freely axially with respect to the cage and the control device. This is advantageous since the longitudinal displacement of the joint elements with respect to each other and the angular deflection of the joint are completely independent of each other as compared to the above-mentioned known sliding joint in which the cage is centered on the inner joint element and therefore the inner joint element can be moved axially with respect to the outer joint element only concurrently with the cage. This has the disadvantage that the possible path of longitudinal displacement decreased with increasing angular deflection of the inner joint element with respect to the outer joint element since with increasing angular deflection the shaft connected to the inner joint element abuts against the outer joint element at a smaller deflection angle.

In order that the sliding universal joint of the present invention is provided with the maximum axial displacement with respect to a given axial dimension of the joint or given dimensions of the outer joint part and to eliminate any sliding of the balls during relative movement between the outer and inner joints, the face of the axial bore through the outer joint element may be provided with a cylindrical shape at least through a portion of the axial dimension of this element. This structure has the advantage of dividing the displacement path into two distinct paths, the path between the outer joint element and the cage and the path between the cage and the inner joint element with both of these paths being added to each other to provide the combined displacement path. The length of the displacement path between the cage and the outer joint element can be limited according to the present invention by stops which are components of the outer joint element. This cannot be done with universal joints according to the prior art since the incorporation of such stops would render impossible the assembly of the joint. Essentially, the inner surface of the outer joint element is provided with a cylindrical surface which at both ends merges into spherical surfaces or conical surfaces which limit the axial movement of the balls.

In order to increase the bending angle while retaining a relatively large displacement of the centers of the inner and outer spherical surfaces of the cage on both sides of the plane passing through the centers of the ball without hindering in any way the guiding of the balls by the cage, the cage opening surfaces disposed in a plane extending at right angle to the axis of the cage and adjacent to the center of the outer spherical surface of the cage are provided with radially inwardly projecting extensions which extend through at least a portion of the circumferential length of each opening surface. As a result of this construction a universal joint is obtained which provides good control because of the relatively large lever arms.

Other objects and advantages of the present invention will be apparent upon reference to the accompanying description when taken in conjunction with the following drawings, which are exemplary, wherein:

FIG. 6b is a front elevational view of the locking member of FIG. 6a;

FIGS. 12a – 15a are transverse sectional views, respectively, of the control elements of FIGS. 12 – 15;

FIG. 27 is a half longitudinal section of a sliding universal joint having a modified inner surface on the outer joint element according to the present invention;

FIG. 28 is a half longitudinal sectional view of a fixed universal joint according to the present invention wherein the inner joint element incorporates a modification;

FIG. 29 is a view similar to that of FIG. 28 but showing a modification thereof;

FIG. 29a is an enlarged detailed view of the detailed indicated as "X" in FIG. 29;

FIGS. 30 – 33 are views similar to that of FIG. 28 and showing further modifications thereof;

FIG. 34 is a longitudinal sectional view of a sliding universal joint for large bending angles according to the present invention and having a modified cage structure; and FIG. 35 is a transverse sectional view through the joint of FIG. 24.

Proceeding next to the drawings wherein like reference symbols indicate the same parts throughout the various views and corresponding elements indicated by corresponding hundreds, a specific embodiment and modifications of the present invention will be described in detail.

Figure 1:
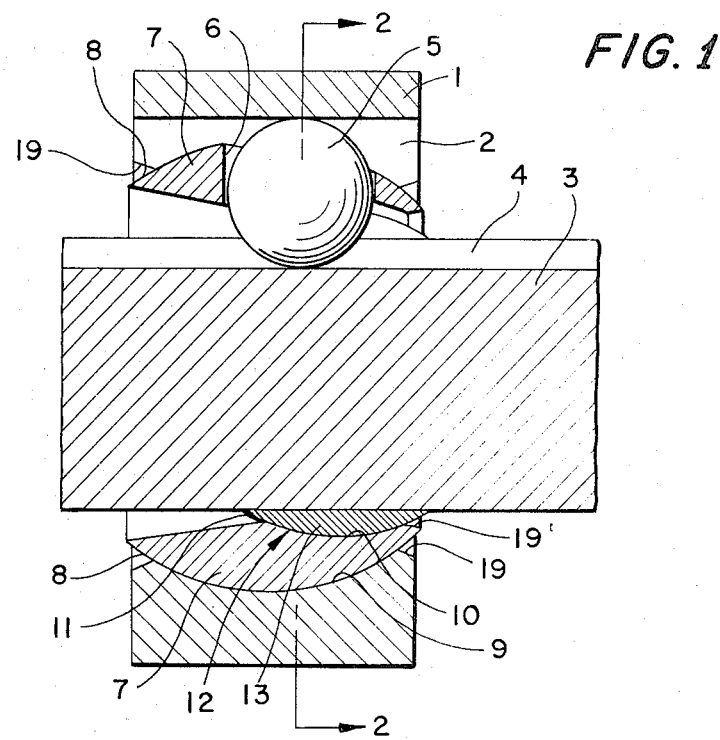
FIG. 1 is a longitudinal sectional view of a sliding joint according to the present invention and taken along the line 1—1 of FIG. 2.
Figure 2:
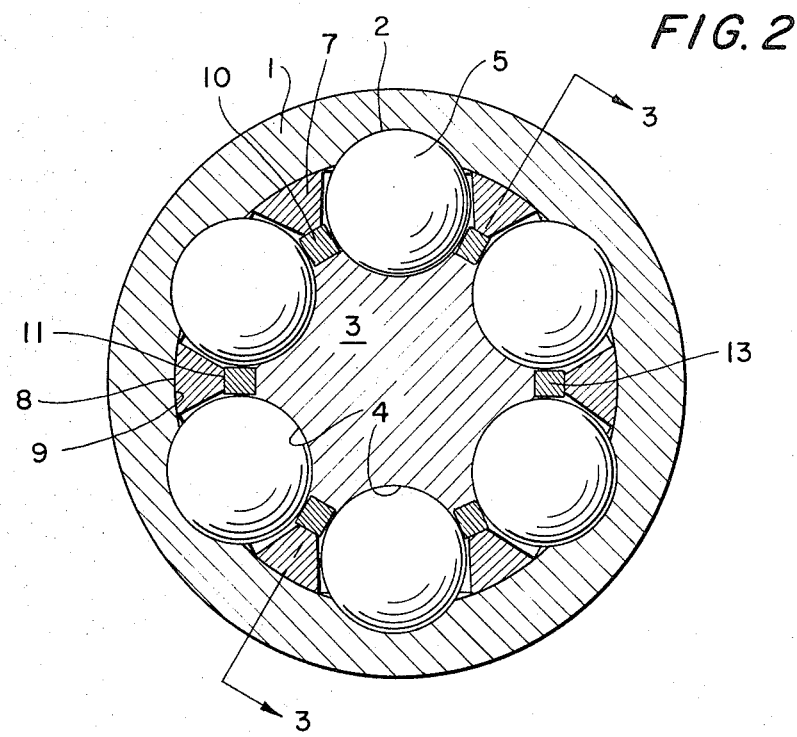
FIG. 2 is a sectional view taken along the line 2—2 of FIG. 1.
Figure 3:
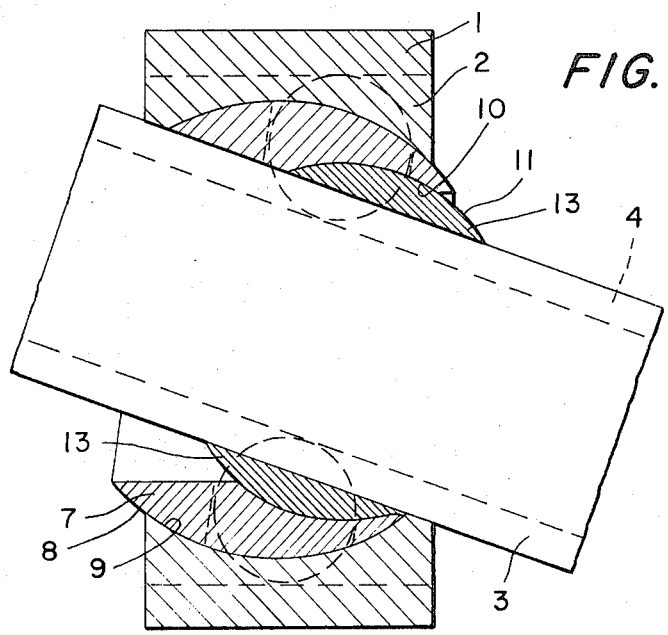
FIG. 3 is a sectional view taken along the line 3—3 of FIG. 2 and showing the joints of FIGS. 1 and 2 at the maximum bending angle.

FIGS. 1 – 3 illustrates a sliding constant velocity universal joint comprising an outer joint element 1 having an axial bore therethrough with a plurality of grooves 2 formed on the surface of the bore which is, in effect, the inner surface of the outer joint element. Positioned within the axial bore is an inner joint element 3 also having a plurality of axially extending grooves 4 thereon which are opposed from the grooves 2 of the outer joint element. The grooves 2 and 4 are parallel to the central longitudinal axis of the outer joint element and are opposed from each other to form pairs of opposed grooves. The grooves may be spiral with opposite pitch in the inner and outer joint elements or extend along the tangents to such spiral lines. However, the joint according to the present invention is particularly simple when the grooves in each joint element always extend parallel to the axis of the joint element. The grooves may also be made so that at least a portion of each groove is parallel to the axis of the joint element.

A ball 5 is positioned in each pair of opposed grooves in order to transmit a torque between the outer and inner joint elements. The balls 5 are retained in openings 6 of a ball retaining cage 7.

The cage 7 is provided with an outer spherical surface 8 which coacts with a hollow or concave spherical surface 9 formed in the outer joint element 1. On its inner face, the cage 7 is provided with a spherical surface 10 which coats with a spherical surface 11 on the outer surface of a control device 12.

The control device comprises a plurality of control elements 13 (FIG. 1) always positioned between balls 5 on the outer faces of the ridges formed between adjacent longitudinal grooves 4 in the outer surface of inner joint element 3. The outer faces of the ridges are parallel to the axis of the joint, inner joint element 3 is thus axially moveable with respect to the remaining components of the joint while the control device 12 cannot be displaced with respect to the outer joint element 1 because of the coacting spherical surfaces 10 and 9. By fixing the control device 12 against axial movement on the inner joint element 3 the universal joint will function as a fixed joint, ie. a joint which is capable only of angular deflection between the joint elements.

The centers of the spherical surface pairs 8,9 and 10,11 are positioned axially equidistantly on opposite sides of a plane passing through the center of the ball opening 6 in such a manner that the central plane of the joint within which is always positioned the centers of the balls will coincide with the plane that bisects the bending angle of the joint. This relationship assures the synchronism between the driving and driven shafts to which the universal joint is connected.

Figure 4:
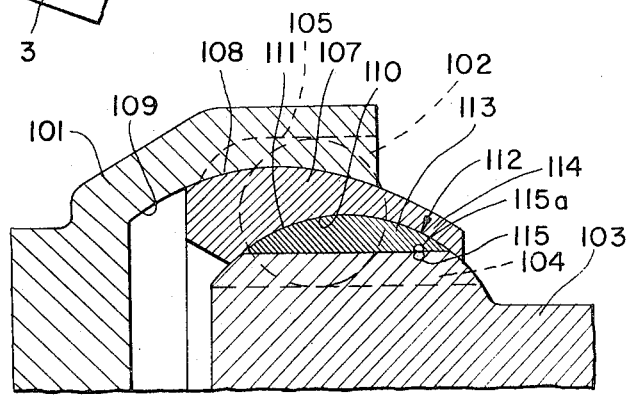
FIG. 4 is a longitudinal half sectional view through a fixed joint according to the present invention.
Figure 4A:
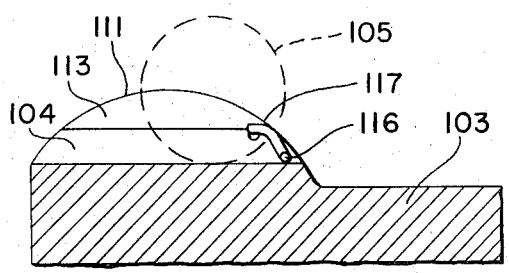
FIG. 4a is a longitudinal half sectional view of the inner joint element of FIG. 4 and showing a modified retainer against axial movement.
Figure 5:
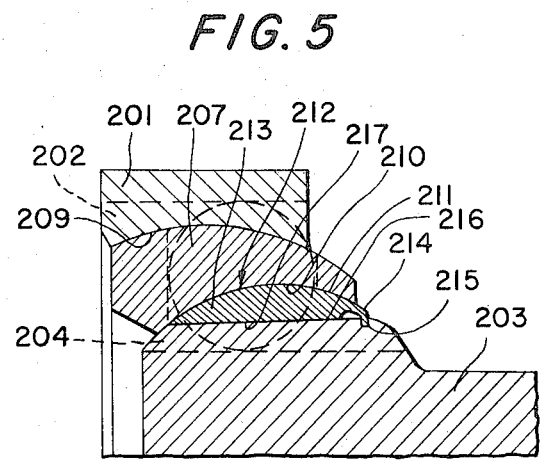
FIG. 5 is a view similar to that of FIG. 4 but showing a modification thereof.

In FIGS. 4, 4a and 5 there are illustrated fixed joints according to the present invention. In these joints, the control device is held fixed against axial displacement on the inner joint element in contrast to the sliding joint of FIGS. 1 – 3 wherein the control device is axially displaceable thereon.

In the sliding joint of FIGS. 1-3 the central point of the joint will always remain in the same position for all bending angles of the universal joint which is contrary to the relationship in known universal joints. Accordingly, the present universal joint has a smaller bending angle while the deflection or displacement of the articulated shaft end away from the center of the joint remains the same. This is of particular importance in the case of front wheel drive vehicles wherein the front wheels are also steered.

The control device 113 in FIG. 4 is fixed against axial displacement by means of a slotted or continuous resilient ring or lock washer 114 inserted in an annular groove 115 formed in the outer surface of an inner joint element 103 and coregistering circumferential grooves 115a formed in the inner faces of the control elements 113. In the fixed joint of FIGS. 4 and 4a the outer joint element 101 is in the form of a socket in the inner face of which is a spherical surface 109 which coacts with the outer spherical surface 108 of cage 107. The relationship of the inner and outer spherical surfaces 108 and 109 on the cage and the function of the joint except for its lack of axial displacement is the same as the joint illustrated and described in FIGS. 1–3.

In the joint of FIG. 4a, a spring ring 116 has a forward configuration corresponding to the outline of the inner joint element. The spring ring 116 is provided with a plurality of sections 117 parallel to the axis of the joint and positioned on both sides of every ridge defined by adjacent longitudinal grooves 104. The sections 117 prevent a dislocation of the control elements 113 from the ridges.

The fixed universal joint of FIG. 5, operates the same as the joints of FIGS. 4 and 4 a and comprises an outer joint element 201 which consists of a relatively narrow ring or annular member. The cage 207 is similar to cage 107 in a joint of FIG. 4 and a control device 212 is provided having a spring catch 214 at one end with the catch projecting into a circumferential groove 215 formed in the outer peripheral surface of inner joint element 203 to lock the control element 213 against axial displacement on the inner joint element 203. The mating outer surface 216 of inner joint element 203 and surface 217 of control device 212 are provided with closely conforming conical shapes.

Figure 6:
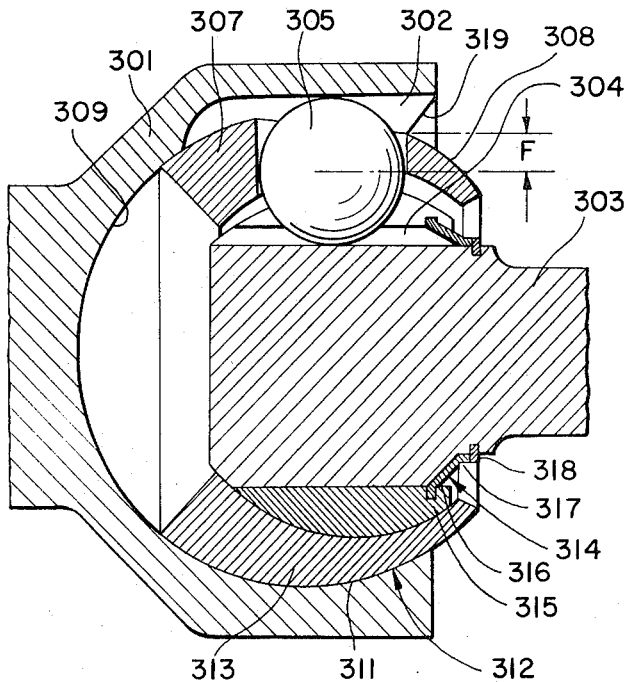
FIG. 6 is a longitudinal sectional view of a fixed joint having a large bending angle.
Figure 6A:
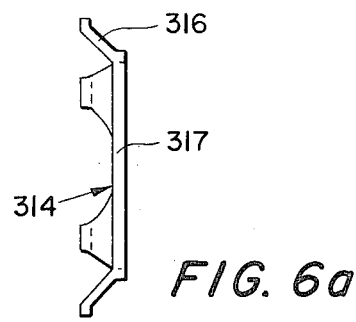
FIG. 6a is a side elevational view of a locking member for the control device on the inner joint element of FIG. 6.
Figure 6B:
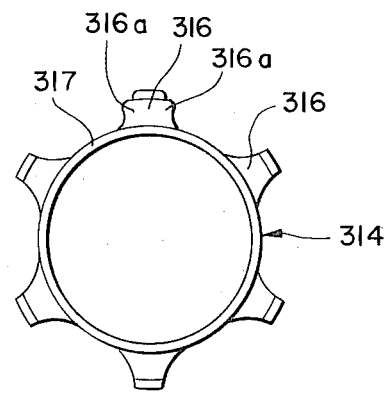
Figure 7:
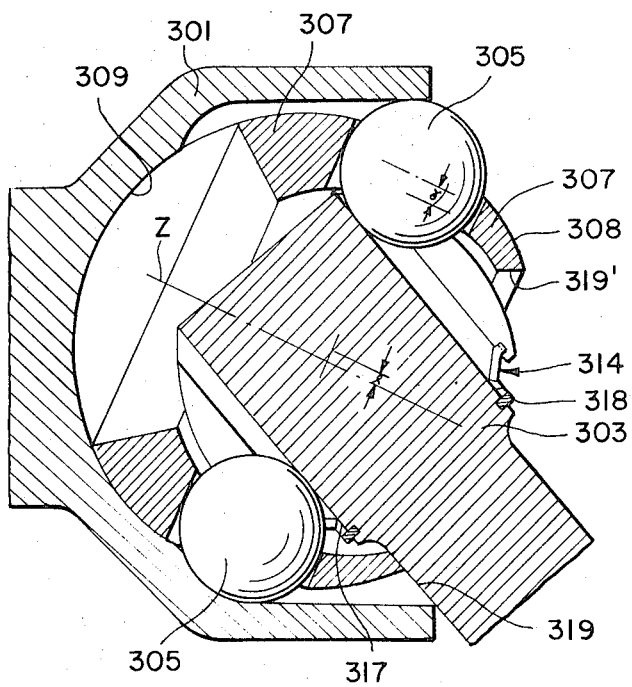
FIG. 7 is a view similar to that of FIG. 6 but showing the joint at its maximum bending angle.

In FIGS. 6 and 7 is illustrated a universal joint according to the present invention which is particularly suited for a large bending or deflection angle. This joint comprises an outer joint element 301 having a socket or bell shape with one end of this socket being closed by a continuous spherical surface 309 and receives an outer spherical surface 308 of cage 307. A control device 312 is retained on inner joint element 303 by a star-shaped locking ring 314 having outer prongs 316 (see FIGS. 6a and 6b) engaging a groove 315 in the inner surface of the control device and whose annular portion 317 is held axially by means of a resilient ring 318 inserted in an annular groove formed in the inner joint element 303.

In both the sliding and fixed universal joints of FIGS. 1 and FIG. 6, respectively, the edges of the inner surface of the outer joint element are beveled at 19 in FIG. 1 and 319 in FIG. 6 at an angle corresponding to the maximum bending angle of the joint. These beveled or chamfered surfaces thus define stops or abutments for the inner joint element.

In assembly, the locking ring 314 is inserted from right to left as viewed in FIG. 6 while being pivoted 90° from its position as shown in this figure. In this pivoted position, the prongs 316 are located in the centers of grooves 304 of inner joint element 303 as viewed axially. When the locking ring 314 is inserted to its intended axial position, the ring is pivoted through 90° into its final assembled position. In order to retain the ring 314 in this position, two corners 316a of the upper prong 316 shown in FIG. 6b are bent laterally over the edges of the grooves 304. As seen in FIG. 6a the prongs 316 extend obliquely away from the annular portion 317 so that the annular portion remains outside of the range of movement of balls 305.

In FIG. 7 the joint of FIG. 6 is shown at its maximum angle of deflection. In this position, the cage axis Z which is perpendicular to the plane of the joint passing through the centers of balls 305 is offset by an amount $e$ with respect to the center of the joint which is the point of intersection of the axes of the two joint elements 301 and 303. In this position, the balls 305 are at different distances from the axis Z as will be evident from FIG. 7 wherein the upper ball is slid outwardly from its cage opening by an amount $r$.

Figure 6C:
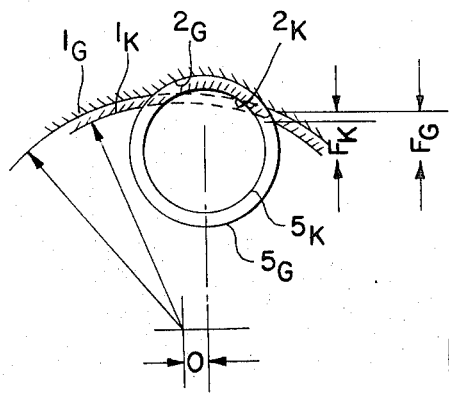
FIG. 6c is a schematic sectional view through ball grooves of a previously known universal joint and of the joint according to the present invention for illustrating the larger bending angle of the latter.

As shown in FIG. 6, the height of the cage ball opening indicated at F must be greater than or equal to the sum of distances $r$ and $e$ in order to permit the upper ball 305 to slide outwardly on the surface of the opening at the maximum angle of deflection without dropping from the opening. When a larger ball is employed which is made possible by the present invention, the distance F may be greater than in the known universal joints that are limited to using smaller balls while the other dimensions remain identical. This is illustrated in FIG. 6c which shows a ball $5_K$ in a groove $2_K$ of an outer joint element $1_k$ of a known joint and a ball $5_G$ in a groove $2_G$ of an outer joint element $1_G$ of the universal joint of the present invention. These structures are in cross section and superposed upon each other with all other relationships being equal. With a given center offset magnitude 0 of the center of curvature of the inner surface of the outer joint element it is apparent that the possible window height $F_G$ can be greater in the joint of the invention than the window height $F_K$ in the known joint. Consequently, the angle of deflection of the present joint can be increased with respect to the known joint.

Figure 8:
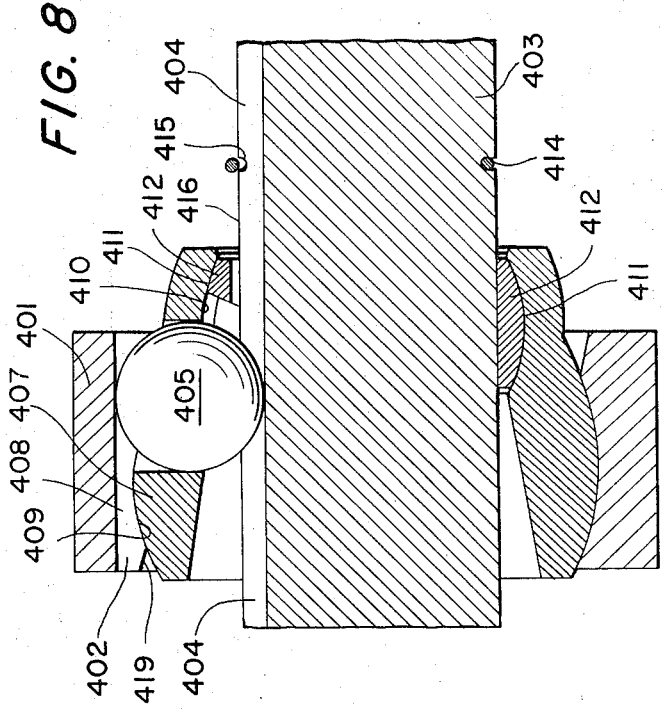
FIG. 8 is a longitudinal sectional view of a modification of the universal joint of the present invention.

In FIG. 8 there is illustrated a sliding joint according to the present invention for average bending angles. In this joint, the axial distances of spherical surfaces 408 and 410 on cage 407 with respect to the central plane of the cage is relatively larger than in the previously described joints. The control device consists of a continuous cam 412. The cage 407 has its outer spherical surface 408 guided on the inner spherical surface 409 of outer joint element 401 and is therefore held axially with respect to the outer joint element. Axial displacement between the joint elements is obtained by the displacement of the control device cam 412 on the cylindrical outer surface 416 of the inner joint element 403. However, this axial displacement is limited by a resilient ring 414 inserted in an annular groove 415 in the inner joint element 403.

Figure 9:
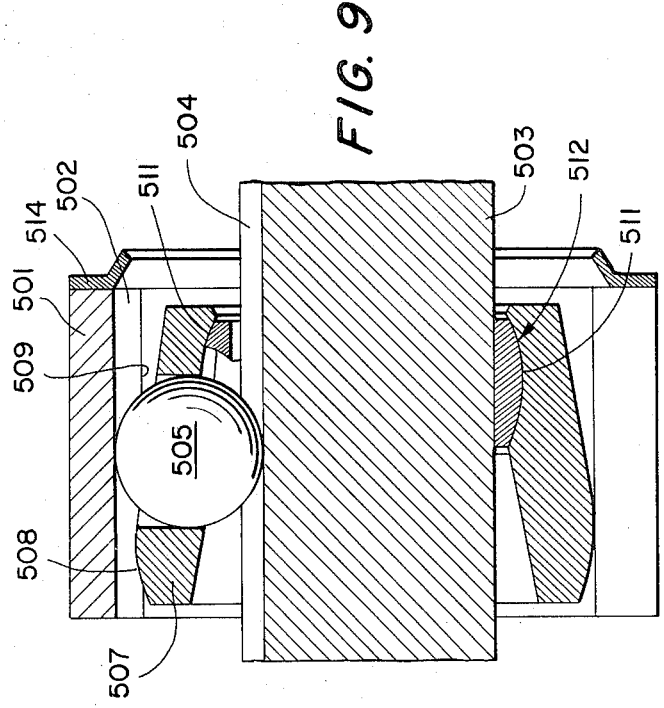
FIG. 9 is a view similar to that of FIG. 8 but showing modified structure for limiting axial displacement of the cage.

The sliding joint of FIG. 9 differs from the joint of FIG. 8 in that the inner spherical surface 509 on the outer joint element 501 which guides outer spherical surface 508 of cage 507 is provided with a cylindrical shape. This permits an axial displacement of the cage 507 with respect to the outer joint element in addition to the possible displacement of control device 512 on the inner joint element 503. For eliminating the displacement of the cage, a stop ring 514 is provided on the outer joint element 501 so as to be engageable with balls 505 in the cage. Thus, the sliding joints of both FIGS. 8 and 9 provide end stops for relative displacement of the cage with respect to the joint element which possesses the shorter axial grooves so as to prevent disengaging of this joint element with the balls. In both embodiments of FIGS. 8 and 9 the joint element with the shorter axial grooves is the outer joint element 401 in FIG. 8 and 501 in FIG. 9.

Figure 11:
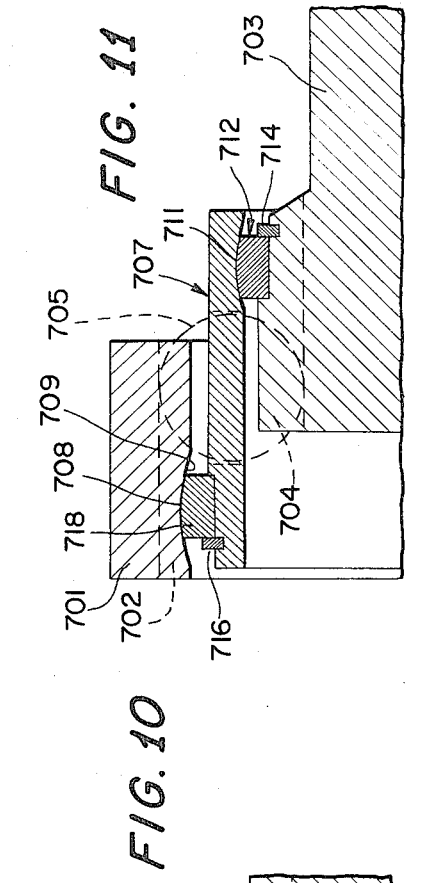
FIGS. 10 and 11 are longitudinal half sectional views of a further modification of a sliding joint and fixed joint, respectively, according to the present invention.
Figure 10:
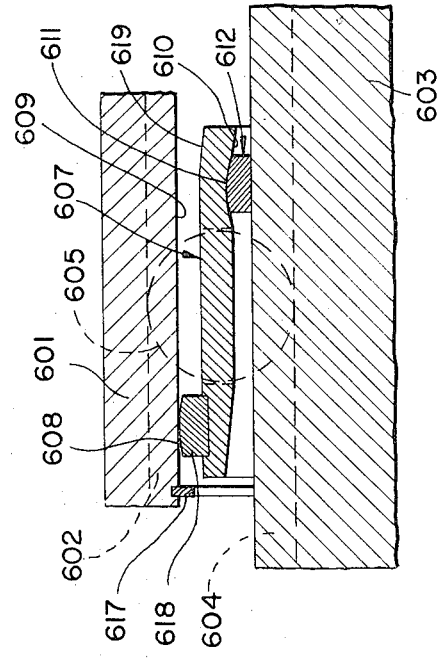

In FIG. 10 there is shown a sliding joint and FIG. 11 shows a fixed joint, both of which are intended for relatively small bending angles. The sliding joint of FIG. 10 is similar to the sliding joint of FIG. 9 in that the inner surface 609 of outer joint element 601 is cylindrical. This permits axial displacement not only between control device 612 and inner joint element 603 but also between cage 607 and outer joint element 601. Cage 607 has the shape of a cylindrical sleeve and is provided within one end thereof with an annular spherical recess 610 which coacts with spherical surface 611 of ring 612 which comprises the control device. At its other end, the cage is provided with an external peripheral groove in which is inserted a ring 618 having a spherical surface 608 coacting with the cylindrical inner surface 609 of outer joint element 601. The rings 612 and 618 are slotted or split to facilitate assembly. The distance between the centers of curvature of spherical surfaces 608 and 610, 611 is relatively large.

The central point of the spherical surface 611 of ring 612 is positioned mid way between the end surfaces of the ring. This results in a simplified structure of the control device and also provides very precise and exact control since the distance of the central point of the spherical surface and, accordingly, the center point of the spherical surface of the cage is positioned at a relatively large distance from the plane passing through the centers of the cage openings that retain the balls in a plane.

In the fixed joint of FIG. 11, the rings 712 and 718, corresponding to rings 612 and 618 of FIG. 10, are continuous and not slotted and are urged against shoulders on inner joint element 703 and cage 707, respectively, by means of lock rings 714 and 716. In addition, the inner surface 709 of outer joint element 701 which coacts with a spherical outer surface 708 of ring 718 is spherical so that an axial displacement between the cage 707 and the outer element 701 is not possible.

FIGS. 12 – 15a show several modifications of control element 13 of FIG. 1 all of which can be used in the joints disclosed and illustrated in FIGS. 1–9. These FIGS. illustrate individual control elements and a plurality of these elements always comprise the control device. However, the control elements of FIGS. 12–15a may also be connected into a cam by means of an annular member, as will be presently described. When such a unitary control device is employed, the illustrations in FIGS. 12–15a are to be understood as longitudinal sections through a cam prong of such a control device.

Figure 12:
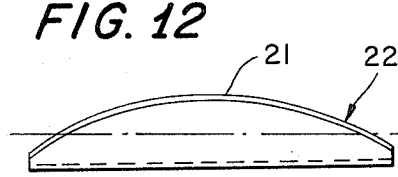
FIGS. 12 – 15 are side elevational views of modifications of control elements according to the present invention.
Figure 12A:
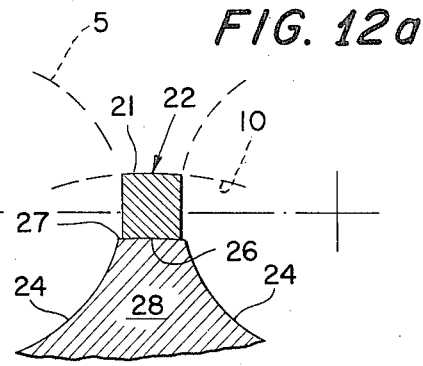

In FIG. 12 control element 22 has an outer spherical 21 which coacts with the inner spherical surface of the corresponding ball retainer cage. The control element 22 has an inner partly cylindrical concave surface which is positioned upon a convex partially cylindrical surface 27 and on a ridge 28 which is defined by two adjacent partially cylindrical longitudinal grooves 24 for balls 25. The control element 22 can thus slide axially on ridge surface 27 and takes along the cage (not illustrated) by coaction with its spherical surface 21.

Figure 13:
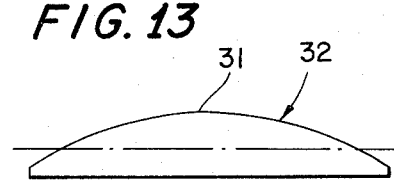
Figure 13A:
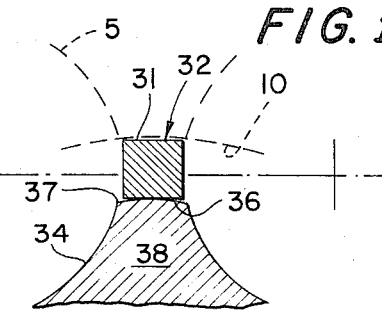

In FIGS. 13, 13a control element 32 has its outer surface 31 in the shape of a portion of a cylinder. The cylindrical surface 31 has a somewhat smaller radius than spherical surface 10 (indicated by dash lines) of the ball retainer cage which is not illustrated. The cage thus rests with its spherical surface contacting only the two outer edges of control element 32. Further, the inner surface 36 of control element 32 is substantially flat or even beveled so as to make line contact on the partially cylindrical surface 37 of ridge 38. Since these control elements must absorb only control forces which are of relatively small magnitude, the guiding arrangement by means of the edges of the control elements is generally sufficient, particularly since the edges become somewhat worn down after a relatively short period of operation. It is less expensive to manufacture control element 32 than the control element 22 since it is easier to form a cylindrical surface on the outer face and a straight surface on the inner face than to form a spherical surface on the outer face and a cylindrical surface on the inner face.

The control elements of FIGS. 12 and 13 are each supported laterally by the balls 5. This support is not necessary for control element 42 of FIGS. 14 14a since this control element is provided with a V-shaped inner surface 46 which conforms to a corresponding recessed V-shaped surface 47 in ridge 48. Control element 42 is thus maintained against circumferential displacement and does not require any lateral support from balls 5. Accordingly, control element 42 may have a narrower dimension than control elements 22 or 32.

The control elements of FIGS. 12 and 13 have a width corresponding to the distance or clearance between the balls in the cage and are oriented automatically with their longitudinal axes being parallel to the ridges between the grooves of the inner joint element since the control elements are pivotable only about a single axis passing through the center of their outer surface and are supported by the balls at a distance from such an axis.

Figure 15:
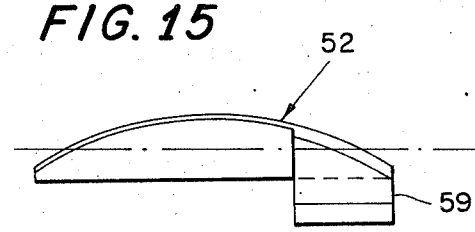
Figure 15A:
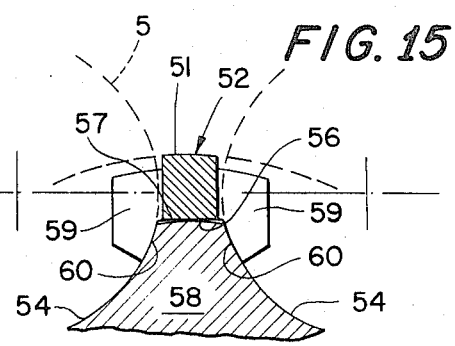

In FIGS. 15, 15a control element 52 is positioned against lateral movement by guide pieces 59 extending in the lateral direction. These guide pieces straddle ridge 58 of the inner joint element and are provided with inwardly facing guide surfaces 60 which guide axially control element 52 with respect to the longitudinal grooves 54 of the inner joint element.

Figure 14:
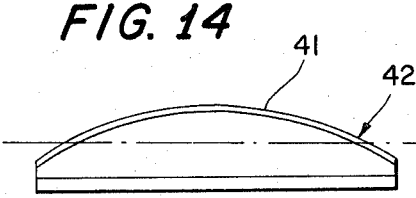
Figure 14A:
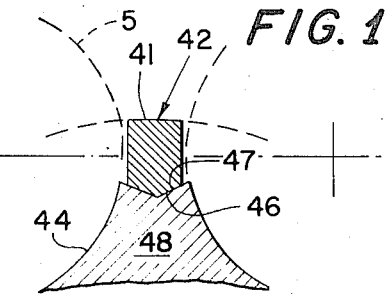

The control elements of FIGS. 14 and 15 have a width less than the distance between the balls and are maintained against pivoting around a vertical axis by having a configuration on their inner surfaces conforming to a configuration on the outer face of the ridge between grooves.

Figure 16:
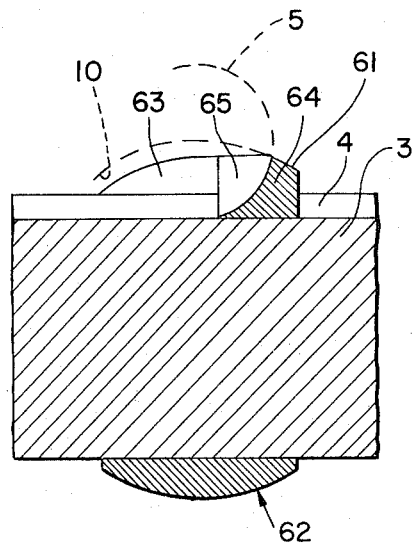
FIG. 16 is a longitudinal sectional view showing a modified control device according to the present invention and taken along the line 16 — 16 of FIG. 17.
Figure 17:
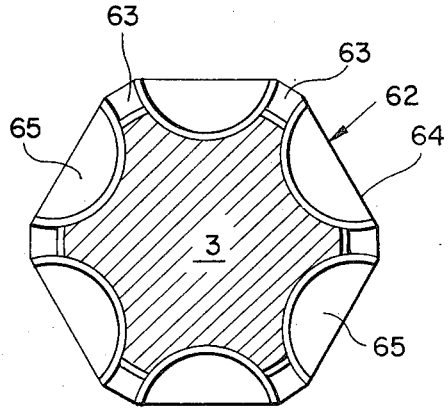
FIG. 17 is an end elevational view of the joint of FIG. 16.
Figure 18:
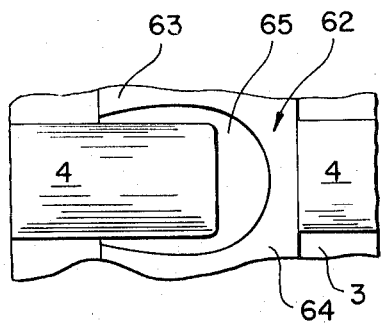
FIG. 18 is a top plan view of a portion of the joint of FIG. 16.

In FIGS. 16 – 18 the control device comprises an annular cam 62 which possesses a maximum degree of rigidity. The cam essentially comprises an annular member interconnecting a plurality of individual control elements 63 which are now essentially in the form of prongs disposed on both sides of a longitudinal groove 4 as may be seen in FIG. 18. The cam 62 comprises an annular ridge 64 which fills completely the space between the inner spherical surface 10 of a ball retainer cage (indicated by dash lines in FIG. 16) and the outer surface of inner joint element 3. However the space between longitudinal grooves 4 is not filled. The annular ridge 64 is recessed at 65 to form a spherical recess which is an extension of the slot formed between adjacent prongs 63 within which is received ball 5 as similarly shown in dashed lines in FIG. 16. The position of ball 5 illustrated in FIG. 16 corresponds to the position wherein the universal joint is bent to its maximum angle of deflection.

Figure 19:
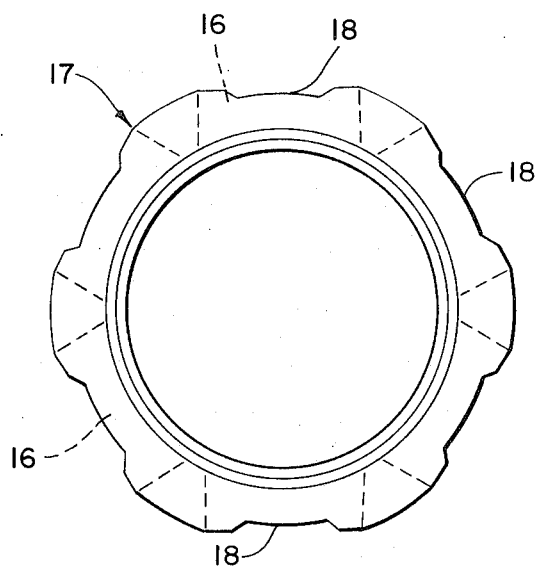
FIG. 19 is an end elevational view of a ball retainer cage for a universal joint according to the present invention.

In FIG. 19 there is illustrated a ball retainer cage 17 which is particularly suited to facilitate assembly in a universal joint of the present invention. The cage 17 is provided with axial longitudinal grooves 18 at the center of each ball opening 16. Each groove 18 has such a width and depth that it can receive the ridge between adjacent longitudinal grooves on the outer joint element. This makes possible an axial insertion of cage 17 into the outer joint element. The assembly of the cage is completed by subsequent rotation of the cage through an angle which is about half of the distance between center lines of adjacent ball openings 16.

Figure 20:
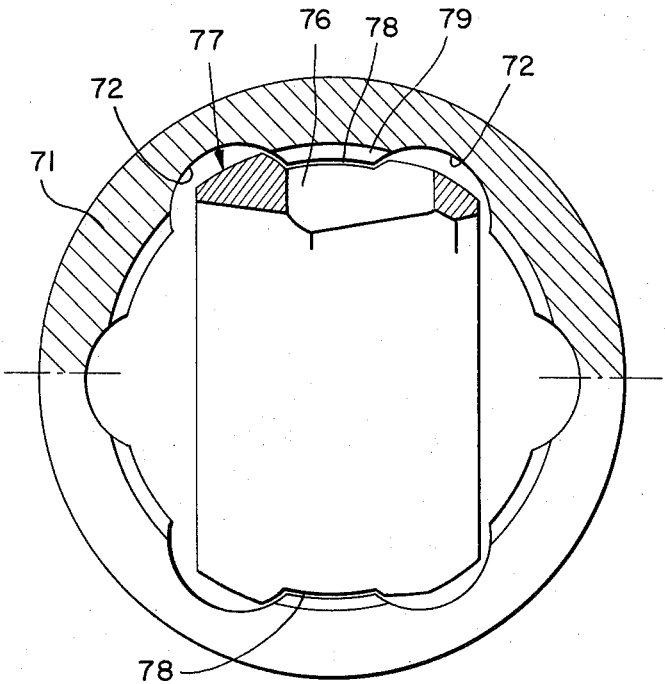
FIG. 20 is an end elevational view of the outer joint element, partially in section, of the present invention and the cage in the assembly position.

In FIG. 20 cage 77 is provided with transverse grooves or slots 78 at least in two diagonal positions. The grooves 78 have a width and depth so as to be capable of receiving ridges 79 between longitudinal grooves 72 of outer joint element 71. As a result, the cage 77 can be axially inserted into the outer joint element in a position pivoted 90° from its final position. After insertion, the cage is then pivoted 90° so that its longitudinal axis is aligned with the longitudinal axis of outer joint element 71. Subsequently, the cage 77 is then rotated about its axis about half the distance between adjacent cage openings as was done with the cage in FIG. 19 so that cage openings 76 register with grooves 72 of the outer joint element.

Figure 21:
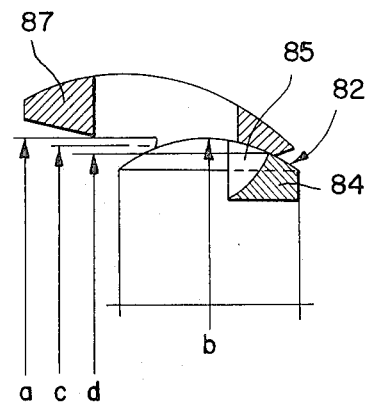
FIG. 21 is a half longitudinal sectional view of the cage and control device of the present invention illustrating dimensional relationships.

FIG. 21 illustrates the preferred dimensions of a cage and corresponding annular control device 82 in order to enable the control device 82 to be inserted axially into cage 87 from left to right as viewed in FIG. 21. For this purpose, diameter $a$ of a cylindrical section on the inner circumference of cage 87 must be greater than the maximum outside diameter $b$ of control device 82. Further, diameter $c$ on the inner circumference of cage 87 must be greater than diameter $d$ of the control device at the center of its slot. The control device can then be inserted axially into the cage in a position with its cam prongs being at the center of the ball openings of the cage and then brought into its final assembled position by rotation through half the distance between adjacent openings.

Figure 22:
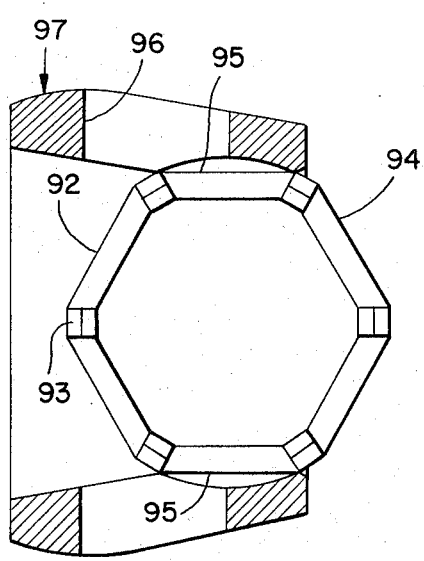
FIG. 22 is a longitudinal sectional view of the cage according to the present invention with a control device in an assembly position turned 90° with respect to its normal position.
Figure 23:
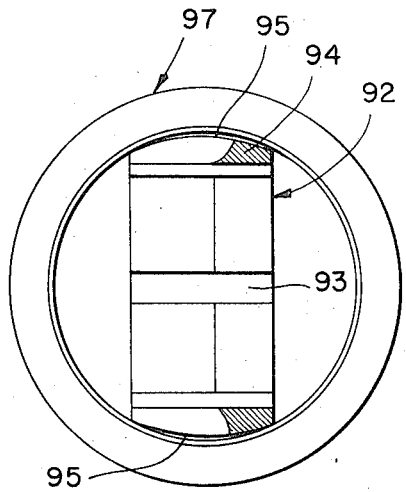
FIG. 23 is an end elevational view of the cage and control device of FIG. 22.

In FIGS. 22 and 23, annular control device 92 has its annular ridge 94 cut off at 95 on at least two opposing surfaces between cam prongs 93. Thus, in assembly, the control cam 92 is inserted axially into cage 97 in a position pivoted 90° from its final position and then subsequently pivoted into its assembled position.

Figure 24:
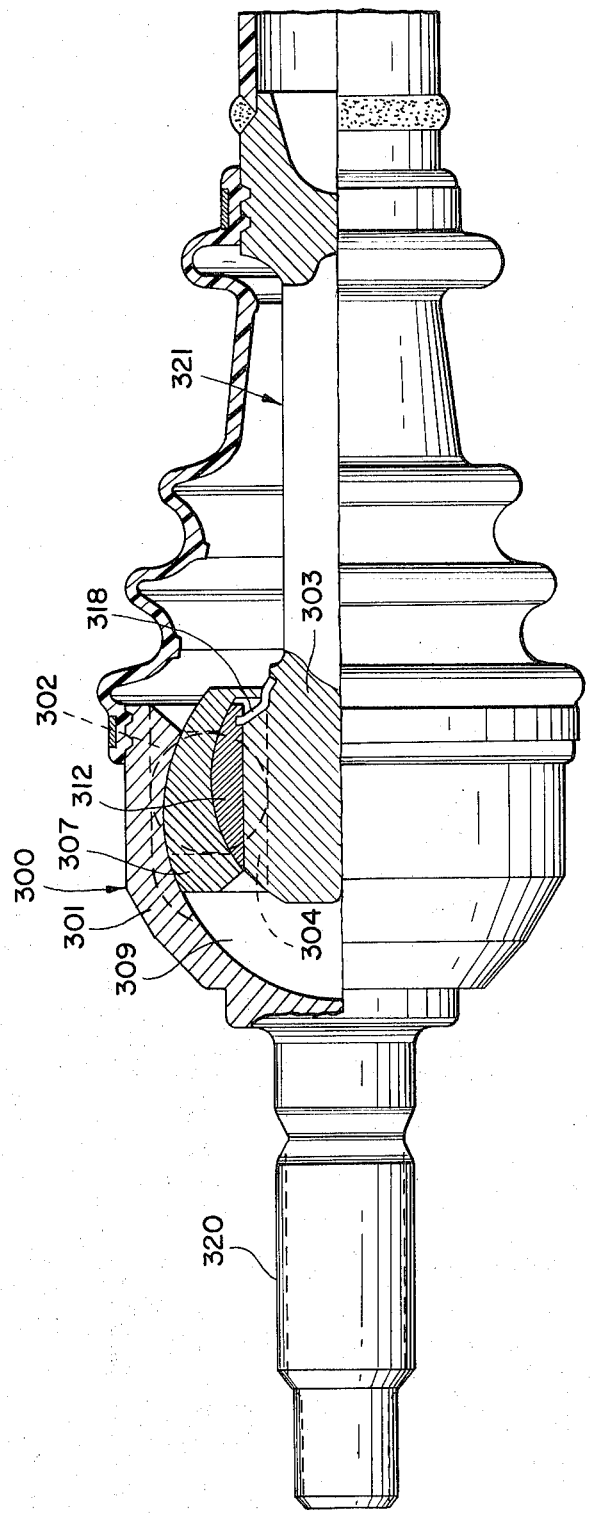
FIG. 24 is a side elevational view partially in section of a fixed universal joint according to the present invention incorporated in the front wheel suspension of a motor vehicle.

In FIG. 24 there is illustrated a fixed joint similar to that of joint of FIG. 6 as applied in the front wheel suspension of a motor vehicle. The several elements are numbered to correspond with the reference numerals of corresponding elements in FIG. 6 and these elements need not be described again in detail. However, this joint is different from the joint of FIG. 6 in that the structure of a star-shaped locking ring 318 is not maintained against axial movement by special Seeger rings but rather by an oblique extension of its annular portion or by a plurality of such extensions which are inserted in correspondingly shaped tangential grooves in the inner joint element 303. To permit assembly, the locking ring 318 is slotted radially. The outer joint element 301 has an axial extension carrying a splined shaft portion 320 at the end of which is a threaded portion with the front wheel of the vehicle being mounted on the spline and held in position by a nut threaded on the end of the shaft. Inner joint element 303 is at the end of an articulated shaft 321 that also is provided with an inner joint element 803 at its other end as may be seen in FIG. 25. The inner joint element 803 is part of a sliding joint 800 that is constructed in the same manner as the fixed joint 300 of FIG. 24 except that the control device 812 does not maintain against axial movement. Outer joint element has an axial extension having a spline connection 822 for connection to the transmission or differential of the motor vehicle.

Figures 25, 26:
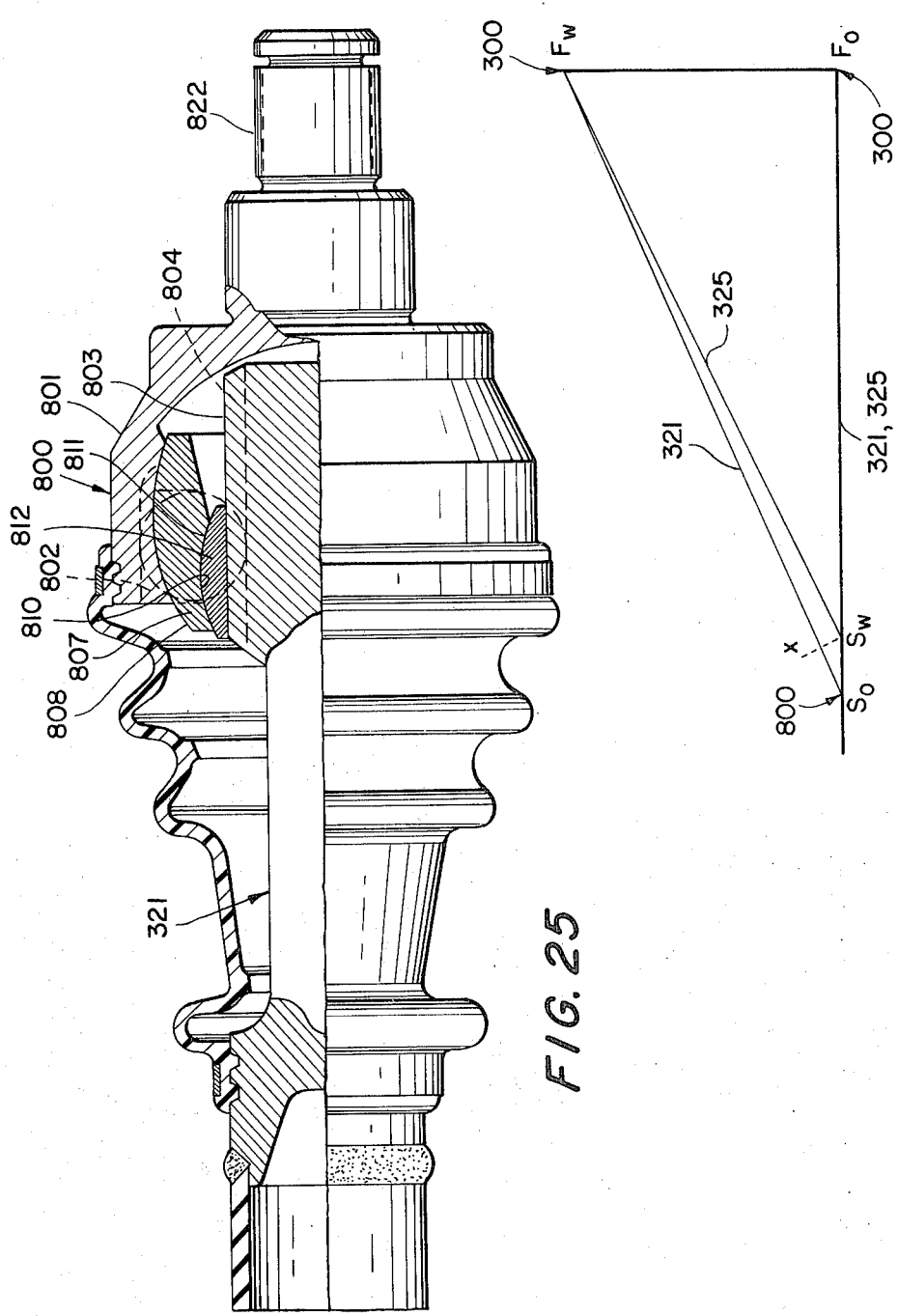
FIG. 25 is a view similar to that of FIG. 24 but illustrating a sliding universal joint.
FIG. 26 is a graph illustrating schematically the difference between a wheel suspension provided with universal joint of the present invention and a wheel suspension provided with a previously known universal joint.

FIG. 26 illustrates schematically the differential effect of the articulated shaft combination of FIGS. 24 and 25 on a wheel suspension for a motor vehicle. $F_0$ indicates the center of the wheel joint 300 at 0° bend of articulated shaft 321 according to the present invention and of an articulated shaft 325 provided with known universal joints. $FF_W$ is the center of the wheel-side fixed joint 300 at maximum deflection angle of articulated shafts 321 and 325. With known universal joints, the distance between the joint center remains constant so that the joint center $S_W$ of a known transmission-side sliding joint is shifted in a direction toward the joint center $F_0$. When the joints of the present invention are used with a cage that is not axially displaceable within the outer joint element, the joint center $S_0$ of the transmission-side sliding joint 800 remains in the same position but the distance between the two joint centers is increased. The angle $F_W S_0 F_0$ is less than the angle $F_W S_W F_0$. Therefore, when the joints of the present invention are used, the maximum bend is less for the same deflection of the wheel. This is also true for the wheel-side fixed joint. As shown in FIG. 26 the path of displacement $S_0 X$ is less when the joints of the invention are employed than the path of displacement $S_0 S_W$ when the previously known universal joints are used.

In FIG. 27, the outer joint element 1 having the inner axial grooves 2 within which balls 5 roll, is provided on its inner surface with a central cylindrical portion 250 within which the outer spherical surface 8 of cage 7' is guided. The ends of the cylindrical surface 250 merge at both ends thereof into spherical surfaces 251 and 252 whose diameters are equal to that of the diameter of cylinder 250. The cylinder surface 250 may also merge at both ends into obtuse conical surfaces. The spherical surfaces 251 and 252 thus limit the axial displacement of cage 7' by providing limiting surfaces contacting the outer spherical surface of cage 7'.

The cage 7' is provided with an inner spherical surface 10 whose center is shifted from the axis of the joint coupling with respect to the center of the outer spherical surface 8. Each control element 13 is axially displaceable on its respective ridge between grooves 4 of the inner joint element 3.

The above described structure thus provides a displacement path which is essentially the sum of a path traversed by cage 7' axially with respect to outer joint element 1 and the path traversed axially by inner joint element 3 with respect to cage 7', a rolling or rotating movement thus occurs in this connection between balls 5 for transmission of the torque and the moving parts.

The spherical surface 251 has a bore 253 whose diameter is less than the diameter of the spherical surface 251 but larger than the outer diameter of inner joint element 3. Similarly, spherical surface 252 has a bore 254 whose diameter is smaller than that of the spherical surface but greater than the outer diameter of the inner joint element 3.

The same results are obtained with the sliding universal joint of FIG. 9 within which the inner face of the outer joint element 501 is in the form of a cylinder 509 throughout the entire axial dimension of the element. The limitation of axial movement is obtained by the stop ring 514 which is attached to the outer joint element 501 and against which balls 505 abut in their end position to limit the axial displacement of the cage 507.

In the sliding universal joint of FIG. 10 a stop ring 617 is provided in an annular groove in the inner cylindrical surface 609 of the outer joint element 601. This stop ring 617 limits the axial movement of the ball retainer cage 607 with respect to the outer joint element 601.

Similar to the joint of FIG. 1 as described previously, the joint of FIG. 28 comprises an outer joint element 1 with an axial bore therethrough having a plurality of circumferentially spaced axial grooves 2 for receiving a plurality of balls 5 for transmitting the torque. The inner face of the outer joint element 1 is also provided with a spherical shape 9 for receiving a cage 350 having an outer spherical surface 351. The cage 250 is provided with a plurality of openings for retaining the balls 5 and is provided with an axial bore 352 extending through the axial length of the cage. The inner surface of the axial bore is provided with a spherical surface 353 in which a plurality of control elements 354 are guided. The control elements 354 rest on ridges 355 defined by adjacent grooves 356 formed in the outer surface of inner joint element 357. The grooves 356 are opposed from the grooves 2 in the outer joint element 1. The diameter of cylindrical bore 352 corresponds approximately to the outer diameter of inner joint element 357 so that the inner joint element can be inserted into the cage 350 axially from either direction.

In addition, the inner joint element 357 is provided with lateral spherical surfaces 358 and 359 spaced axially on either side of the plane passing through the centers of the balls. When the axis of outer joint element 1 and inner joint element 357 are at an angle with respect to each other, lateral spherical surfaces 358 and 359 are in close contact with the hollow spherical surface 353 and 350. No displacement is then possible between the inner joint element 357 and outer joint element 1 and under a bending angle the joint functions as a fixed joint. The center of curvature of the control elements 354 coincides with the center of curvature of the lateral spherical surfaces 358 and 359.

The universal joint of FIG. 29 in its straight or unbent position, differs from the joint of FIG. 28 in that the cage 350' is provided with an inner spherical surface 360 which coacts with at least a portion of the inner joint element 357 on its lateral spherical surface 358. This lateral surface 358 is away from the shaft 361 to which the inner joint element 357 is connected. As a result, the diameter 352' of the cage bore is smaller on this side than the outer diameter of the inner joint element 357. On the other side, the diameter of cylindrical bore 352a' is approximately the same as the outer diameter of the inner joint element 357. This approximately equal diameter relationship must exist on at least one side of the cylindrical bore of the cage 350' in order that the joint can be assembled.

In order to enable the joint of FIG. 29 to absorb axial forces in the direction of the bore 352a' when the joint is in its straight or unbent position, a peripheral groove 362 is formed in the bore 352a', the details of which can be seen more clearly in FIG. 29a. An edge 363 of groove 362 extends approximately parallel to the surface of the spherical surface 359 at a distance which corresponds approximately to the thickness of an elastic or resilient ring 364 inserted in the groove 362. The ring 364 is so dimensioned that its free opening D is less than the outer diameter of inner joint element 357 when the ring 364 is assembled. This dimensional relationship must also exist in the ring 364 should it have a round or rectangular cross section.

The annular groove 362 has a conical or spherical surface whose generatrix is approximately parallel to the spherical surface 353 of cage 350' and the free opening diameter D of the elastic or compressible ring 364 in its assembled position is smaller than the outer diameter of the inner joint element 357. The distance between the generatrices equals the thickness of spring ring 364.

In FIG. 30, a fixed joint similar to that of FIG. 29 is provided with a resilient ring 370 having an outer spherical surface 371 which is shaped to coact with the spherical surface 353 of cage 350'. The inner joint element 357 and control element 354 are recessed to form an annular recess 372. The edge of recess 372 is parallel to the axis of inner joint element 357 and is spaced at a distance to the bore 352a' in the straight or unbent position of the joint which is slightly greater than the maximum thickness of the ring 370. The width of recess 372 and ring 370 is so dimensioned that a side face of ring 370 is closely adjacent to the edge of annular recess 372 which extends at a right angle to the axis of inner joint element 357 so that there is only a minimum play between the joint parts. The ring 370 with its spherical outer surface in effect replaces the lateral spherical surface 359 of FIGS. 28 and 29.

The other lateral spherical surface 358 can also be replaced by a ring similar to 370. Ring 370 and lateral spherical surfaces 358 and 359 perform the same function. In order to avoid my inward radial movement of the ring 370 under the action of large axial forces a securing or retaining member may be positioned in the free space defined between the inner peripheral edge of ring 370 and the peripheral portion of recess 372, after the ring 370 has been assembled and is in its untensioned state.

In the fixed joint illustrated in FIG. 31 the cage 350 has an axial bore 352 therethrough which has the same diameter along the axial length of the cage and corresponds approximately to the outer diameter of inner joint element 357. In the vicinity of an end of the spherical surface 353 of cage 350 the inner joint element 357 is provided with a circumferential groove 380 having such a radial dimension that a resilient or elastic ring 381 positioned in this groove can be so compressed for the purpose of assembly that its outer circumference is within the outline of the inner joint element 357. In the assembled position, the outer circumference of ring 381 is located against the spherical surface 353 of cage 350 and has the same surface configuration so as to coact therewith. Control element 354 is supported axially on a side surface of ring 381. Where small axial forces exist, this structure makes it possible to transfer the function of the lateral spherical surfaces 358 and 359 to ring 381 so that the lateral spherical surfaces are not required in this modification.

In the sliding joint of FIG. 32, cage 350' and ring 371 are the same as the corresponding structures in FIG. 30. However, the inner joint element indicated at 357' has a somewhat different shape. The axial extension of inner joint element 357' is shortened by shifting center 390 of lateral spherical surface 358 along the central axis of the inner joint element in a direction away from this lateral surface, beginning from center 391 of inner spherical surface 353 of cage 350' or the outer sphere of control element 354 by a distance X measured axially along the axis of inner joint element. Accordingly, the inner joint element can be moved axially with respect to control element 354 or cage 350'.

In FIG. 33 there is illustrated a further sliding joint universal coupling that basically corresponds to the structure of the fixed joint of FIG. 31. In this modification, the center 390 of lateral spherical surface 358 is shifted along the axis of inner joint element 357 by an amount X beginning from center 391 of inner spherical surface 353 of cage 350 or the outer sphere of control element 354 in a direction away from the lateral surface 358 in the same manner as described for the sliding joint modification of FIG. 32. Because of the presence of the annular groove 380 and the ring inserted therein, it is necessary to shorten the length of control element 354 by a distance equal to the displacement distance X of centers 22 and 23 beginning from the ring 381.

In FIG. 34 the universal joint illustrated therein is basically a sliding joint similar to that shown in FIG. 1.

The center of the outer spherical surface 8 is indicated at A and the center of the inner spherical surface 10 of the cage 7' indicated at D with both of the centers being on different sides of the plane C passing through the centers of the balls 5.

In order to obtain a large bending angle, the axial bore passing through the cage 7' is widened in the form of a conical surface 450 in the area adjacent control elements 13. The cone angle of cone 450 equals the bending angle since cage 7' performs only one half of the bending angle for moving the balls 5 into homokinetic plane. The other end of the cage axial bore is also widened as shown at 451.

In order to assure a secure guiding of the balls 5 in the widened area of cone 450 of cage 7' the ball opening surfaces 452 that are adjacent to the center A of the cage outer spherical surface 8 are provided with a projection 453 that extends radially into the cone 450 and extends through at least a portion of the length of the opening surface 452 as viewed circumferentially of the cage 7' and illustrated in FIG. 35.

The length and shape of the projections 453, also in the direction of the axis of cage 7', are derived from the dimension and shape of recesses 454 between two cage openings 6 and are determined by the space required by ridges 455 from between adjacent ball grooves 4 of the inner joint element 3 during bending and sliding of the inner joint element with respect to the outer joint element 1 or cage 7'.

The cage 7' is provided with a peripheral groove on its outer circumference in the area of its outer spherical surface 8 which groove extends approximately over the width of cage openings 6 and has such dimensions in depth that the cage 7' can be introduced into the outer joint element 1 in a position rotated by 90° with respect to the outer joint element.

The projection 453 on cage opening surface 452 still provides the advantage that the height of the opening remains approximately the same throughout the length of the opening surface 452 circumferentially of cage 7' and thus the cage is not weakened structurally.

It will be understood that this invention is susceptible to modification in order to adapt it to different usages and conditions, and accordingly, it is desired to comprehend such modifications within this invention as may fall within the scope of the appended claims.

What is claimed is:

1. In a constant velocity universal joint, the combination of an outer joint element having an axial bore therethrough and a plurality of grooves on the surface of said bore, said grooves being substantially parallel to the axis of the outer element, an inner joint element within said axial bore and having a plurality of grooves on its outer surface opposite from said outer element grooves to define pairs of opposed grooves, a plurality of balls between said joint elements to dispose said balls in a plane perpendicular to the axis of the cage, said cage having a first spherical surface on its outer face and a second spherical surface on its inner face, means on the inner surface of said outer joint element coacting with said first spherical surface for guiding the cage with respect to said outer joint element, the centers of said first and second spherical surface being equidistant on opposite sides of the plane passing through the centers of the balls in said cage, and control element means positioned on the outer face of said inner joint element and having spherical surface means coacting with said cage second spherical surface for guiding said cage with respect to said inner joint element.

2. In a constant velocity universal joint as claimed in claim 1 wherein a shaft is connected to said inner joint element.

3. In a constant velocity universal joint as claimed in claim 1 wherein the grooves are parallel to the axis of their respective joint elements.

4. In a constant velocity universal joint as claimed in claim 1 wherein the outer surface of the inner joint element is cylindrical.

5. In a constant velocity universal joint as claimed in claim 1 wherein said control device means is fixed on said inner joint element against axial displacement so that the universal joint functions as a fixed joint.

6. In a constant velocity universal joint as claimed in claim 5 wherein the coregistering outer surface of said inner joint element and the inner surface of the control device means are conical.

7. In a constant velocity universal joint as claimed in claim 1 wherein the control device means is axially displaceable on said inner joint element so that the universal joint functions as a sliding joint.

8. In a constant velocity universal joint as claimed in claim 1 wherein said means for guiding the cage with respect to said outer joint element comprises a spherical surface on the inner face of said outer element bore coacting with said first spherical surface on said cage, and said control device means is axially displaceable on said inner joint element and is fixed against axial displacement with respect to said outer joint element so that the universal joint functions as a fixed joint.

9. In a constant velocity universal joint as claimed in claim 1 wherein said means for guiding the cage with respect to said outer joint element comprises a cylindrical surface on the inner face of said outer element bore coating with said first spherical surface on said cage, and the control device means is fixed on said inner joint element against axial displacement thereon so that the universal joint functions as a sliding joint.

10. In a constant velocity universal joint as claimed in claim 1 wherein the joint element having the shorter axial grooves of the inner and outer joint elements has stop means thereon for limiting the axial displacement of the cage with respect to that said joint element.

11. In a constant velocity universal joint as claimed in claim 1 wherein said control device means comprises a plurality of control elements each disposed on a ridge between adjacent grooves on the inner joint element and between said balls, the outer surface of each control elements having a radius of curvature equal to said second spherical surface on said cage.

12. In a constant velocity universal joint as claimed in claim 11 wherein the outer surface of each control element defines a portion of a cylinder.

13. In a constant velocity universal joint as claimed in claim 12 wherein the edges of a cylindrical portion are chamfered.

14. In a constant velocity universal joint as claimed in claim 11 wherein each of said ridges has an indented surface configuration, the inner surfaces of said control elements conforming to said ridge surfaces.

15. In a constant velocity universal joint as claimed in claim 11 wherein the inner faces of said control elements are flat and tangential to the cylindrical outer surface of the inner joint element.

16. In a constant velocity universal joint as claimed in claim 11 and comprising guide elements on an end of a control element to straddle the ridge on which the control element is positioned so as to guide the control element with respect to the grooves on the inner joint element.

17. In a constant velocity universal joint as claimed in claim 11 and comprising annular means interconnecting said control elements to define a single annular member.

18. In a constant velocity universal joint as claimed in claim 17 wherein said annular member has a plurality of recesses elongated in the direction of the inner joint element grooves, each recess having a spherical portion therein for receiving a ball, a portion of said annular member occupying the space between the second spherical surface of the cage and the outer surface of the inner joint element.

19. In a constant velocity universal joint as claimed in claim 17 wherein said annular member has a polygonal shape with flattened portions in the areas of the balls, there being axially extending elongated portions at the corners of said polygon.

20. In a constant velocity universal joint as claimed in claim 1 wherein there are chamfers on the end edges of the inner surfaces of the outer joint element or cage, said chamfers correspond to the maximum bending angle of the joint to define stop surfaces for the inner joint element.

21. In a constant velocity universal joint as claimed in claim 9 wherein there are chambers on the end edges of the outer surface of the cage corresponding to the maximum bending angle of the joint to define stop surfaces for the outer joint element.

22. In a constant velocity universal joint as claimed in claim 1 wherein said control device means comprises a ring having an outer spherical surface coacting with said cage second spherical surface and an inner spherical surface on said inner joint element, said ring being disposed axially outwardly of said balls.

23. In a constant velocity universal joint as claimed in claim 22 wherein the center of said ring spherical surface is midway of the end surfaces of said ring.

24. In a constant velocity universal joint as claimed in claim 22 wherein said cage comprises a cylindrical sleeve, said cage second spherical surface being at one end of said sleeve, a second ring on the outer surface of said cylindrical sleeve at the other end thereof and fixed against axial displacement, the outer face of said second ring having a spherical surface coating with a spherical surface on the inner face of said outer joint element.

25. In a constant velocity universal joint as claimed in claim 24 wherein said first and second rings are identical.

26. In a constant velocity universal joint as claimed in claim 22 wherein said ring is slotted.

27. In a constant velocity universal joint as claimed in claim 1 wherein said means on the inner surface of said outer joint element comprises a cylindrical surface through at least a portion of the axial length of said outer joint element.

28. In a constant velocity universal joint as claimed in claim 27 wherein said cylindrical surface extends at both ends into spherical surfaces and the diameter of each spherical surface is equal to the diameter of said cylindrical surface.

29. In a constant velocity universal joint as claimed in claim 27 wherein said cylindrical surface extends at both ends into obtuse conical portions.

30. In a constant velocity universal joint as claimed in claim 28 wherein at least one of said spherical surfaces has a bore coaxial with said outer joint element, said bore having a diameter less than that of said spherical surface but greater than the outer diameter of said inner joint element.

31. In a constant velocity universal joint as claimed in claim 1 and comprising stop means within said outer joint element bore for limiting the axial movement of the cage therein.

32. In a constant velocity universal joint as claimed in claim 1 and comprising a ring attached to said outer joint element and engagable by said balls to limit the axial movement of the cage therein.

33. In a constant velocity universal joint as claimed in claim 1 wherein said inner joint element has lateral spherical surfaces on both sides of the plane passing through said balls, the diameter of said inner joint element spherical surfaces corresponding to the diameter of the spherical surface of said control device means.

34. In a constant velocity universal joint as claimed in claim 33 wherein the centers of the radii of curvature of said control device means spherical surface and the lateral spherical surfaces of said inner joint element are the same so as to define a fixed universal joint.

35. In a constant velocity universal joint as claimed in claim 33 wherein the center of the radius of curvature of one lateral spherical surface is shifted along the axis of the inner joint element in the direction toward the other spherical surface to define a sliding universal joint.

36. In a constant velocity universal joint as claimed in claim 33 wherein the inner diameter of the cage laterally to at least one side of the cage second spherical surface is equal to the outer diameter of the inner joint element.

37. In a constant velocity universal joint as claimed in claim 33 wherein the inner diameter of the cage laterally to one side of the cage second spherical surface is less than the outer diameter of the inner joint element.

38. In a constant velocity universal joint as claimed in claim 36 wherein there is an annular groove in the inner surface of said cage, the edge of the groove toward the adjacent end of the cage having a conical surface or a spherical surface whose generatrix is approximately parallel to the generatrix of the second spherical surface of the cage, a resilient ring within said annular groove, the inner diameter of said ring in its assembled position being less than the outer diameter of the inner joint element, the distance between said two generatrices is equal to the thickness of said ring.

39. In a constant velocity universal joint as claimed in claim 33 wherein there is an annular recess in said inner joint element in the vicinity of the end of the second spherical surface of said cage, a resilient ring within said recess, the outer peripheral surface of said resilient ring is spherical to coact with said cage second spherical surface and conforms closely thereto.

40. In a constant velocity universal joint as claimed in claim 33 wherein there is an annular groove within said inner joint element adjacent a lateral spherical surface thereof, a resilient ring within said annular groove, the outer peripheral surface of said resilient ring is spherical to coact with said cage second spherical surface and conforms closely thereto.

41. In a constant velocity universal joint as claimed in claim 33 and comprising means between said ring and the inner joint element for preventing inward radial movement of the ring.

42. In a constant velocity universal joint as claimed in claim 35 wherein said control device means is reduced in length by a distance corresponding to the axial shifting of the centers of the radii of curvature.

43. In a constant velocity universal joint as claimed in claim 1 wherein said cage has a plurality of openings therein with each ball being in one of said cage openings, a radial inward projection on each cage opening surface disposed in a plane perpendicular to the axis of the cage and adjacent the center of the cage first spherical surface, said projection extending over at least a portion of the circumferential length of said cage opening.

44. In a constant velocity universal joint as claimed in claim 43 wherein adjacent projections define recesses therebetween and said recessar are so shaped to accommodate relative movement between the inner joint element and said cage.

45. In a constant velocity universal joint as claimed in claim 1 wherein the axial bore of the outer joint element has a cylindrical shape and the spherical outer surface of said cage is guided in said cylindrical bore.

46. In a constant velocity universal joint as claimed in claim 1 wherein the axial bore of the outer joint element has a spherical shape, and the outer spherical surface of said cage is guided in such concave surface of the outer joint element.

* * * * *